United States Patent [19]
Wright

[11] 3,855,509
[45] Dec. 17, 1974

[54] CONTROL SYSTEM FOR INDUCTION MOTORS

[75] Inventor: Floyd H. Wright, Fort Wayne, Ind.

[73] Assignee: General Electric Company, Fort Wayne, Ind.

[22] Filed: Jan. 21, 1974

[21] Appl. No.: 435,282

Related U.S. Application Data

[63] Continuation-in-part of Ser. No. 245,146, April 18, 1972, abandoned.

[52] U.S. Cl............... 318/227, 318/221 R, 318/230
[51] Int. Cl............................................. H02p 5/40
[58] Field of Search......... 318/221 R, 227, 230, 345

[56] References Cited
UNITED STATES PATENTS

| | | | |
|---|---|---|---|
| 3,307,093 | 2/1967 | Wright | 318/221 R |
| 3,403,314 | 9/1968 | Maynard | 318/227 |
| 3,441,823 | 4/1969 | Schlabach | 318/221 R |
| 3,470,436 | 9/1969 | Steele | 318/227 |
| 3,539,892 | 11/1970 | Lindberg | 318/227 |
| 3,596,158 | 7/1971 | Watrous | 318/227 |

*Primary Examiner*—G. Z. Rubinson

[57] ABSTRACT

Both analog and logic elements are utilized in a control system for an induction motor. A TRIAC delivers power to the run winding of the motor. In response to a control signal which represents the magnetic flux in the air gap, a regulator initiates a control pulse timed after a zero crossing of the alternating current so as to be proportional to the control signal. The control pulse governs operation of trigger circuitry which fires the gate of the TRIAC at a time when the latter is non-conducting. Temperature-responsive and threshold circuits are combined to inhibit application of the firing pulse under a condition of motor overheating or when its rotor is stalled. In addition, a signal representative of motor speed is utilized in threshold circuitry to develop additional firing pulses that are used to gate a second TRIAC which controls the delivery of power to the start winding of the motor. As an adjunct to proportional control of motor operation, the inclusion of supplemental logic components permits the motor alternately to be stopped and started, with the motor reversing direction upon each successive new start, to effect reversal of the motor in response to a stall signal when the motor is operating in one direction and to de-energize the motor upon the occurrence of a stall signal when operating in the other direction. This extended feature is particularly suitable for use in connection with a garage door operator.

22 Claims, 5 Drawing Figures

CONTROL SYSTEM FOR INDUCTION MOTORS

This application is a continuation-in-part application of my copending application Ser. No. 245,146 filed on Apr. 18, 1972, titled "Control System for Induction Motors", now abandoned and assigned to the same assignee as the present application.

INTRODUCTION

The present invention pertains to multifunction motor control integrated circuits. More particularly, it relates to induction motor control circuits that permit phase control, thermal protection, auxiliary winding switch operation and operational sequence programming.

For many years, "on-off" mechanical controls have been included in single-phase induction motors to function as start switches and to provide thermal overload protection. The fairly recent introduction of bidirectional solid-state switches, capable of handling motor current levels, has resulted in various suggestions for replacing mechanical switches entirely by utilizing solid-state control circuitry. Solid-state devices have also been incorporated into motor speed control systems. For example, phase control circuits have been devised for governing the firing of solid-state switches which vary the power applied to the motor in order to effect speed regulation.

Generally speaking solid-state circuitry for motor control and operation constitutes an improvement over mechanical systems because of increased reliability and durability. Moreover, electronic circuitry inherently provides enhanced flexibility of adjustment, affording opportunity for the inclusion of convenient user controls. Notwithstanding these and other advantages attendant to solid-state circuitry, and in part also because such circuitry has attracted the inclusion of additional control function, the overall control systems have tended to become both cumbersome and expensive.

It is, accordingly, a general object of the present invention to provide a new and improved solid-state induction motor control system which is capable of being constructed in a manner economical in terms of both cost and space requirements.

A specific object of the present invention is to provide a motor control circuit capable of being formed economically from readily available integrated circuits.

A further object of the present invention is to provide solid-state motor control systems in which air gap flux regulation is achieved by phase control.

Still another object of the present invention is to provide an improved solid-state system in which phase control circuitry also serves to implement stall and overload thermal protection.

A still further object of the present invention is to provide a new improved solid-state motor start switch.

Yet another object of the present invention is to provide a new and improved solid-state motor control circuit which permits both discrete and continuous control of motor speed and torque in both directions of rotation.

SUMMARY OF THE INVENTION

In carrying out the above and other objects in at least one preferred form, I provide a control system for an induction motor that has a first and second phase winding, i.e., main and auxiliary windings. In an illustrated embodiment, the main and auxiliary windings are "run" and "start" windings, respectively. Incorporated into the motor are measuring means for developing a control signal proportional to the level of magnetic flux present in the motor air gap. A solid-state gate-operated bidirectional switch controllably delivers power from an alternating-current source to the run winding in an amount proportional to the conduction angle established by its gate. In response to the control signal as well as to the instantaneous phase angle of the alternating current, a regulator initiates a control pulse timed after a zero crossing of the alternating current by an amount that represents the control signal. In response to that control pulse and to the conduction state of the switch, trigger circuitry applies a firing pulse to the gate of the switch in correspondence with the control pulse and only in the absence of conduction by the switch.

BRIEF DESCRIPTION OF THE DRAWINGS

The subject matter which is regarded as constituting the invention is particularly pointed out and distinctly claimed in the concluding portion of this specification. The invention itself, however, both as to its organization and method of operation, together with further objects and advantages thereof, may best be understood by reference to the following description taken in connection with the accompanying drawings, in the several figures of which like reference numerals identify like elements, and in which:

DETAILED DESCRIPTION OF THE EMBODIMENTS

Figure 1:
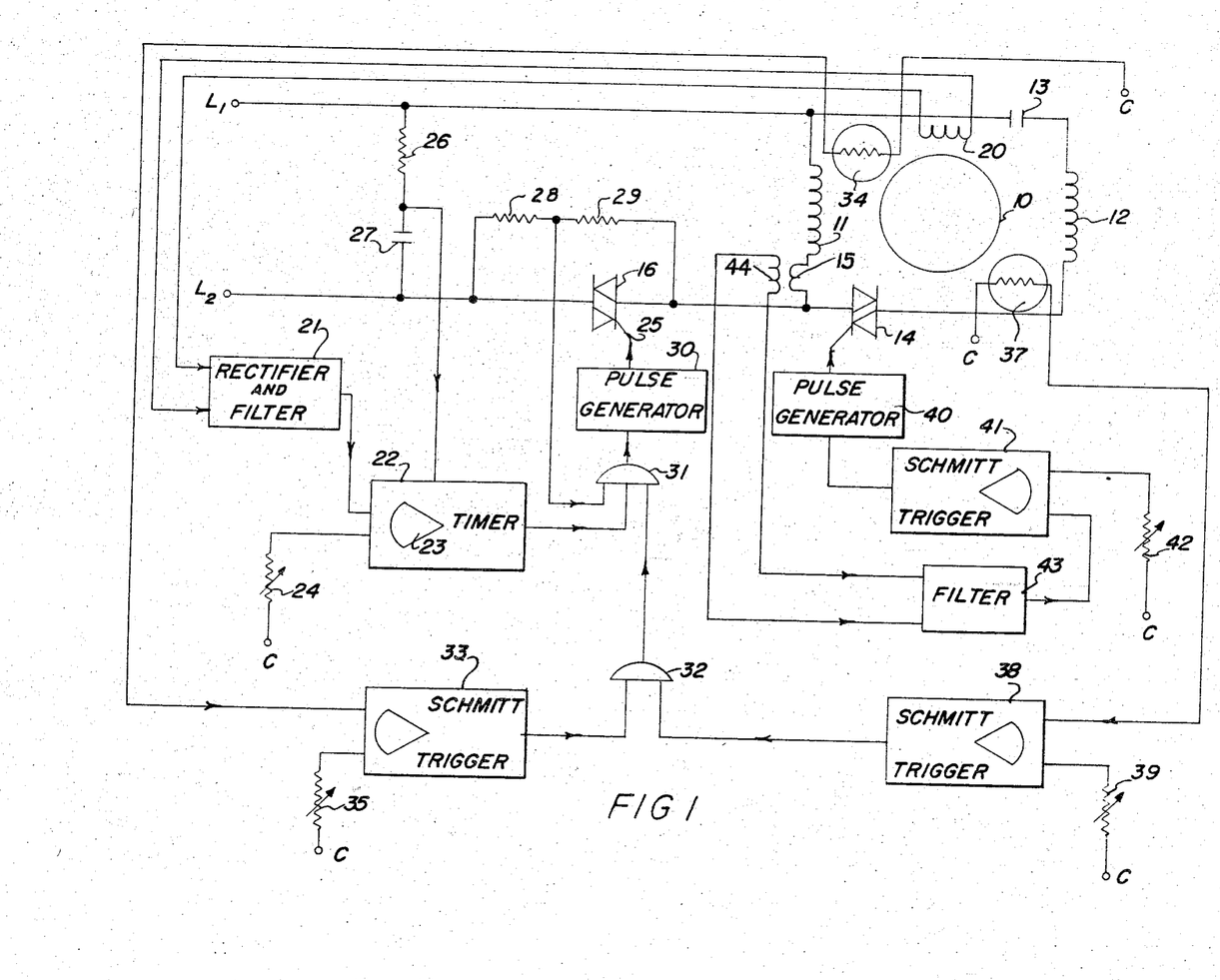
FIG. 1 is a schematic diagram of one embodiment of a motor control system.

In FIG. 1, an induction motor includes a rotor 10 together with the usual run winding 11 and start winding 12, those two windings being angularly displaced within the stator of the motor so that, in turn, their respective currents are electrically displaced. Start winding 12 is connected in series with the usual starting capacitor 13, with that combination being electrically connected in parallel with winding 11 through a start switch element 14 which in this case is a solid-state gate-operated bidirectional switch commonly known as a TRIAC.

One side of winding 11 is connected directly to line terminal $L_1$, while its other side is connected through a measurement-transformer primary winding 15 and a run switch 16 to the other line terminal $L_2$. Switch 16 again is a TRIAC.

In terms of conventional operation of such a motor, operation is begun by closing run switch 16 and start switch 14 to energize run winding 11 and start winding 12 whereupon torque is developed by rotor 10. The rotor increases its speed comparatively quickly, and shortly before reaching full operating speed, start switch 14 is cut out or opened.

Physically situated within the stator of the motor is a winding 20 that is exposed to the magnetic flux present in the air gap between the rotor and the stator. The control signal developed by winding 20, and fed through a time-delay filter and rectifier 21 to a timer 22, is proportional to the level of the motor air-gap flux. Timer 22 includes a differential amplifier 23 for the control signal, the gain being externally adjustable by means of a variable resistor 24 connected to a source of bias potential C.

Solid-state switch 16 is caused to conduct by the application of a firing pulse to its gate 25. Thereafter, the switch continues in a conductive state only until the immediately succeeding zero crossing of the alternating-current power from terminals $L_1$ and $L_2$. By successively applying firing pulses during each half-cycle of the supplied power and varying the phase angle during which the switch remains conductive in each cycle, the power actually delivered to the motor is correspondingly varied. However, for the system accurately to proportion the delivered power in response to the air gap flux level as measured by winding 20, it is necessary to time the firing pulses applied to gate 25 relative to the zero crossings of the supplied power. To this end, the supply is sampled by means of a resistor 26 connected in series with a capacitor 27 across terminals $L_1$ and $L_2$, the sample being delivered from the junction between the resistor and capacitor to timer 22. While the actual mechanism of timer 22 may take a variety of forms, a somewhat fundamental arrangement is simply to use a unijunction oscillator which is synchronized to the power line by means of the sample derived from between resistor 26 and capacitor 27. In operation, timer 22 then serves as a regulator which responds both to the rectified control signal from winding 20 and to the instantaneous phase angle of the supplied alternating current to initiate a control pulse that is timed after a zero crossing of the alternating current by an amount which represents the control signal.

A pulse generator 30 produces the actual firing pulses applied to gate 25. Moreover, generator 30 is controlled by the signal from the output of AND gate 31, producing one firing pulse for each logic one appearing at output of gate 31 and remaining quiescent at all times when the output of gate 31 is a logic zero.

Gate 31 in this case has three inputs. One is connected to the output of timer 22 to receive the flux-proportional timed control pulses which, as seen by gate 31, are logic one bits. A second input of gate 31 is connected to the junction of voltage dividing resistors 28 and 29 and serves to supply a logic one signal to gate 31 when switch 16 is in a non-conducting condition. Resistor 28 and resistor 29 are connected in series bridging switch 16 and are large enough to prevent high leakage current from bypassing switch 16. The third input will be discussed hereinafter. For clarity of illustration, the conventional power supply connections for the different circuit components and stages are not shown in the drawing. It is to be understood that the power source and reference connection of gate 31 is to the line on the motor side of switch 16 so that a logic zero appears at gate 31 when switch 16 is conducting.

By including gate 31 and pulse generator 30 in the phase control loop also composed of timer 22, filter 21 and winding 20, control power may be "full on" regardless of load power factor. Since the induction motor is a variable power factor load and the current lags the voltage, a firing pulse otherwise could be generated before switch 16 turned itself off at a zero crossing. The result would be the application of uneven half cycles of power applied to the motor under circumstances when the control power should be maximum. AND gate 31 cooperates with timer 22 to insure that there is both the desired control timing interval and voltage across switch 16 before the latter is fired.

Because the nature of an AND gate is such that a logic one must appear at all of its inputs before a logic one will appear at its output, it will be observed by reference to FIG. 1 that a logic one signal also must be present from the output of an AND gate 32 which is connected to the remaining input terminal of AND gate 31. The first input terminal of gate 32 receives an inhibit signal developed by a differential-type Schmitt trigger circuit 33. One input of trigger circuit 33 is connected through a thermistor 34 to a source of reference potential C. The other input of trigger circuit 33 permits external adjustment of the threshold level within the trigger circuit by being returned through a variable resistor 35 again to a source of reference potential. Thermisitor 34 is thermally bonded tightly to main winding 11 so as to serve as a sensor and develop a thermal signal representative of the rapid rise in motor temperature which occurs when the rotor is locked or stalled.

A second thermistor 37 also is disposed within the motor but is less closely coupled or bonded to main winding 11 so as to be slower acting and thus develop a delayed thermal signal representative of the motor temperature. Thermistor 37 thus serves as a longer-range overload-representative signal. One end of the thermistor 37 is returned to a source of reference potential C as before, and its other end is connected to one input of a Schmitt trigger circuit 38. The other input of trigger circuit 38 is returned to a source of bias potential C through a variable resistor 39 once more for the purpose of providing external reference-level adjustment of the trigger circuit threshold. The output of trigger circuit 38 is connected to the other input terminal of AND gate 32.

Absent a thermal signal from either thermistor 34 or thermistor 37 representing a condition of excess temperature, trigger circuits 33 and 38 remain quiescent and the signal levels at their outputs, which are fed to the two input terminals of gate 32, represent a logic one. Accordingly, a logic one appears at the output of gate 32 and is applied to the corresponding input of gate 31. When, however, an excess thermal signal is produced by either one or both of thermistors 34 and 37, the corresponding one (or ones) of trigger circuits 33 and 38 produces a continuous series of logic zero pulses. Since a logic zero applied to either or both input terminals of AND gate 32 causes a logic zero to be applied to gate 31, an overload temperature sensed by either thermistor results in the appearance of a logic zero at the output of AND gate 31. In turn, that results in termination of the application of firing pulses to switch 16. That is, the thermal protection circuitry functions to "lock-out" the phase control loop and thereby prevent further motor energization. At the same time, a significant portion of the phase-control loop also serves as a portion of each of the two different thermal-protective systems. The combined analog and logic statement descriptive of the interaction between the different portions of the system as thus far described is that a firing pulse is applied to solid-state switch 16 when a specified time interval has elapsed from the last zero crossing and the switch is not conducting and the thermal protection has not changed to the high-temperature state.

Preferably, trigger circuit 38 is designed, in a manner well known as such, to exhibit a hysteresis characteristic. That is, the trigger circuit responds to an initial threshold level of input signal to begin developing its output pulses and thereafter continues to develop those pulses until the input signal level has dropped to a selected lower level indicating that the motor has substantially cooled. In operation, this results in an overloaded motor being cycled on and off. On the other hand, trigger circuit 33 preferably is operated so as to continue producing its output inhibit pulses until subsequently manually reset after the reason for the stall condition has been corrected.

In operation of the motor control system as thus far described and using a permanent split-phase capacitor-start motor, the regulation of air gap flux has been found to be particularly effective in establishing a high starting torque. By maintaining the air gap flux constant, reduced saturation problems have been encountered in the presence of a variable supply voltage. For example, a 115-volt motor operating on a 130-volt line exhibited almost 40 watts more power loss without regulation of air gap flux as compared to when its air gap flux was regulated so that only 100 volts rms was applied to the main winding. In terms of speed variation as a function of line voltage, with air gap flux regulation, a speed variation of only 10 rpm at 380 rpm resulted when the line voltage was varied from 100 to 130 volts. Absent air gap flux regulation, the speed varied from 380 to 1,040 rpm with the same line voltage variation.

The time constant of filter 21 results in a time lag during motor start-up which may be utilized to increase starting torque at a low-speed motor setting. By choosing a longer time constant for filter 21, substantially full torque may be obtained for a correspondingly longer period of time during starting.

In one exemplary system, the time constants of the two thermistors differed by a ratio of five to one. Thermistor 34 was sufficiently bonded to the main winding so that its temperature lagged the actual winding temperature, as determined by resistance measurements, by only two seconds. Consequently, good locked-rotor protection was obtained because the fan motor under control exhibited a winding-temperature rise at stall of approximately 2°C/second. As an alternative to the illustrated use of two separate thermistors, essentially the same result may be obtained by employing but a single thermocouple having close thermal bonding to the motor winding. The developed thermal signal is used directly as a stall indication while an "overload" comparator is supplied with a delayed version of the same signal. With a temperature differential of approximately 12° C. between the indication of the stall condition and that of the overload condition, an integrator may be used to delay the original stall signal by 40 seconds.

Turning now to the remainder of the system of FIG. 1, solid-state switch 14 is rendered conductive by the application of firing pulses from a pulse generator 40. In turn, pulse generator 40 is actuated by signals received from the output of a Schmitt trigger circuit 41, again of the differential type. One input of trigger circuit 41 is returned to a bias source C through a variable resistor 42 which serves as a threshold-setting control. The other input of trigger circuit 41 receives, through a filter 43, a speed-representative signal developed by a secondary winding 44 coupled to primary winding 15.

Winding 44 permits detection directly of the power supply current instantaneously being fed to the motor. Because that current decreases as rotor 10 increases its speed of rotation, the signal from winding 44 is representative of motor speed. Alternatively, the frequency of flux variation in the motor or a separate tachometer generator driven by rotor 10 may be utilized to develop such a speed-representative signal. In the arrangement described wherein winding 44 produces an alternating-current signal, filter 43 includes a rectifier so that a proportioanl direct-current signal is fed to trigger circuit 41. The time constant of filter 43 may be selected to achieve whatever amount of delay is desired in the control loop.

As in the case of trigger circuit 38, trigger circuit 41 exhibits hysteresis so that the energization and de-energization of starting winding 12 occurs at different speeds. This permits the start winding to pick up at one level of torque output from the shaft of rotor 10 and drop out when a higher torque level desired for normal operation is reached. Also as in the case of trigger circuit 38, the hysteresis characteristic of trigger circuit 41 is readily adjustable so as to permit selection of the two different levels.

When using a split-phase capacitor-start induction motor, the leading power factor of its starting winding allows application of the speed-representative signal directly to trigger circuit 41 without additional concern with phase angle. On the other hand, different motors, such as those of the split-phase resistance-start type, may require that filter 43 also include the function of shifting the phase of the input signal fed to trigger circuit 41. Generally speaking, both filters 21 and 43 also serve to suppress inductively coupled noise present in those circuits. In some systems, similar noise filtering may desirably be added between thermistors 34 and 37 and trigger circuits 33 and 38, respectively.

Figure 2:
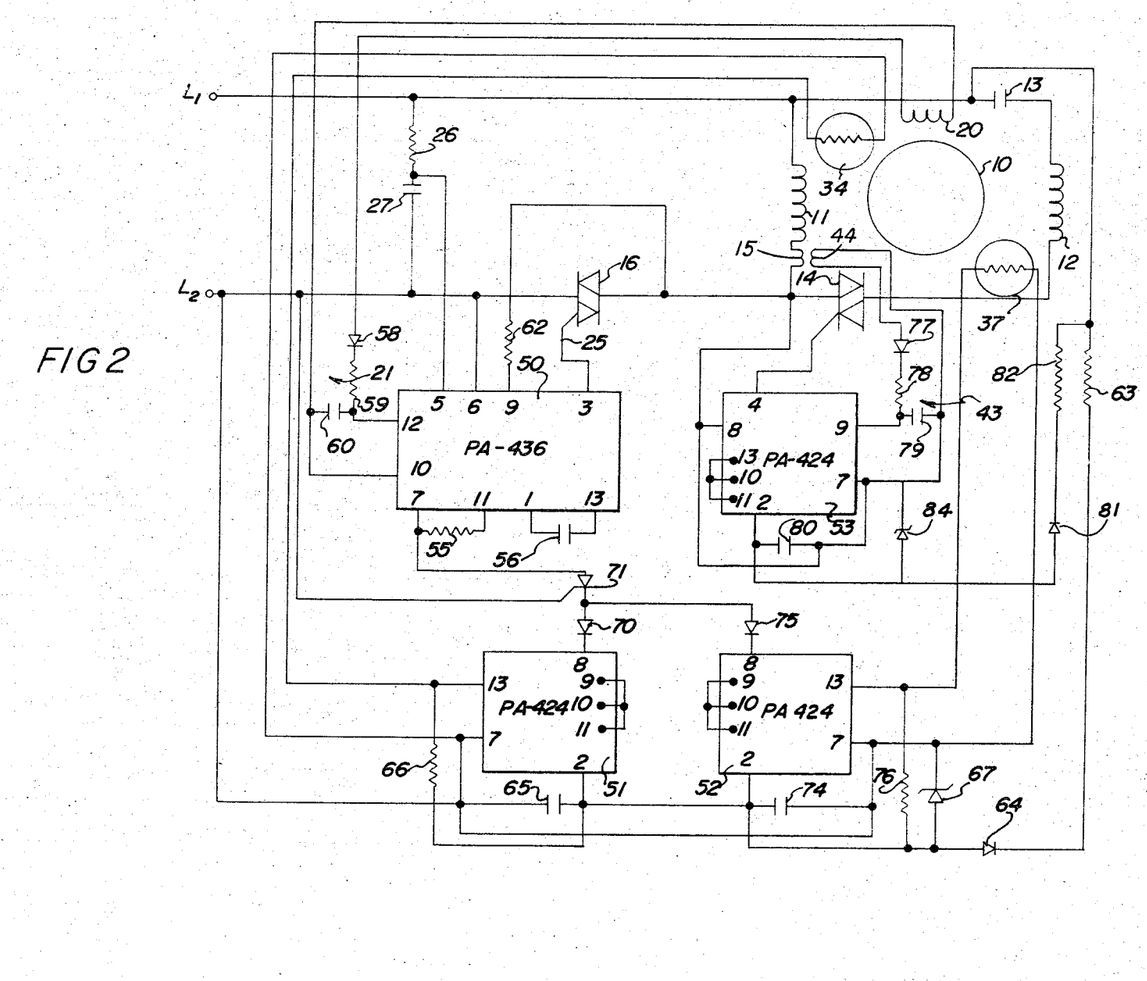
FIG. 2 is a schematic diagram of the control system of FIG. 1 modified and implemented by the inclusion of standard monolithic integrated circuits.

The components of the start switch controller may be included on the same semi-conductor chip on which the components of the phase-control loop are integrated. With current technology, such a complete integrated circuit is of hybrid design to include both thick-film and large-scale monolithic circuitry as well as a few discrete capacitors. However, the present level of integrated circuit expertise renders it difficult to utilize a sufficiently small chip to enable the production of an economic unit. Advantageously, these limitations may be overcome by employing a combination of presently-available standard monolithic circuits together with a few discrete components. FIG. 2 depicts such a combination which includes a PA-436 integrated-circuit phase control 50 and three PA-424 integrated-circuit zero-voltage switches 51, 52 and 53. The terminal numbers appearing within the rectangles in FIG. 2 that denote these different monolithic circuits are the same as those standardized in the industry.

Having become commercially standard, it is unecessary to describe in detail the actual circuit diagrams of monolithic circuits 50–53. Nevertheless, a brief functional explanation may be beneficial in gaining an understanding of their manner of performance in the combination illustrated. Basically, the resulting control loops and systems shown in FIG. 2 operate the same as in the system of FIG. 1.

Phase control 50 is a pulse-generating circuit which includes a differential amplifier in its input circuitry. As such, it has been used as a TRIAC triggering circuit for both resistive and induction motor loads. Its power supply is derived directly from the alternating-current supply line and it requires only a few external components for complete operation. Overall, the phase control 50 offers ramp and pedestal operation, adjustable gain and low power dissipation. It also has a built-in inhibit function which prevents premature gating of the controlled TRIAC when used with inductive loads, and it establishes a minimum TRIAC blocking voltage before gating. Superimposed on the pedestal level is an adjustable cosine ramp function for obtaining a linear relationship between input and output voltage. The slope of that ramp determines the overall circuit gain and is controlled by selection of the value of a resistor 55 connected between its terminals 7 and 11 and a capacitor 56 connected between its terminals 1 and 13. The ramp current appears at terminal 13 and a potential of appropriate polarity applied to this terminal or to terminal 7 also may be utilized to inhibit operation of the pulse generation function in a manner analogous to the use of pulses passed by AND gate 32 and fed to AND gate 31 in FIG. 1 for the purpose of inhibiting operation of pulse generator 30. Terminal 9 similarly requires an enable current with reference to terminal 6 in order to permit pulse generation. Terminal 6, together with terminal 5, serves as the power supply connection while at the same time permitting the derivation of zero-crossing information. Finally, terminals 10 and 12 serve as input connections to the included differential amplifier.

Accordingly, the air-gap flux signal from winding 20 is fed through filter 21 to input terminals 10 and 12 of phase control 50. Filter 21 includes a diode 58, to rectify the flux signal, in series with a resistor 59 to input terminal 12. The filter is completed by a capacitor 60 connected between terminals 10 and 12. Terminal 6 is connected to the supply line from power terminal $L_2$, while enable current is delivered to terminal 9 through a resistor 62 connected to that same supply line at a point on the other side of solid-state switch 16 from the connection to terminal 6. Consequently, the generation of firing pulses, which are applied from terminal 3 to gate 25 of the switch, is permitted only when switch 16 is non-conductive so that a potential appears thereacross. Terminal 5 is connected to the junction between resistor 26 and capacitor 27 so as to be returned to the other main power supply line that is connected to terminal $L_1$.

The zero-voltage switches each are basically a combination of a threshold detector and a trigger circuit intended for controlling a TRIAC, pulsing the gate of the latter at the point of zero voltage. Normally, they are used to control resistive loads. Each includes a differential-amplifier input section having alternative input terminals 9 and 13 which are referenced to either of direct-current power supply terminals 2 and 7. Following the input section is a zero-crossing detector to which terminal 5 is internally connected to provide zero-crossing information. The zero-crossing detector drives an output section from which triggering pulses are delivered by a terminal 4. Within each zero-voltage switch, terminals 9 and 13 are connected individually to the respective bases of a pair of transistors which together constitute the differential amplifier in the input section. Moreover, the arrangement is such that, when the transistor connected to terminal 13 is conducting, all output from the switch is prohibited. On the other hand, whenever the transistor connected to terminal 13 is cut off, an output signal appears at terminal 8. Finally, terminals 10 and 11 are internally connected respectively to terminals 7 and 2 through respective ones of a balanced pair of resistors.

As incorporated into the control system of FIG. 2, only the input sections of zero-voltage switches 51 and 52 are utilized. Accordingly, the thermal signal from thermistor 34 is applied between active input terminal 13 and reference input terminal 7 of switch 51. Line terminal $L_2$ is connected to terminal 7, while line terminal $L_1$ is connected through a resistor 63 and a diode 64 to terminal 2. The latter is coupled to terminal 7 by a capacitor 65 and to terminal 13 by a resistor 66, and a stabilizing Zener diode 67 is connected between terminals 2 and 7. The remaining active input terminal 9 is connected to terminals 10 and 11. Finally, output terminal 8 is connected through a blocking diode 70 and a silicon-connected rectifier (SCR) 71 to terminal 7 of phase control 50; the gate of silicon-controlled rectifier 71 is referenced to line terminal $L_2$.

In operation, the development of a thermal signal by thermistor 34 that represents a locked or stalled rotor condition exceeds the threshold of zero-voltage switch 51 established for cut off of the differential amplifier internally connected to terminal 13. The resulting output signal from terminal 8 is then fed through diode 70 and SCR 71 to terminal 7 of phase control 50 in order to block generation of the firing pulses otherwise applied to gate 25 of solid-state switch 16.

In a similar manner, the thermal signal from thermistor 37 is applied to input terminals 13 and 7 of zero-voltage switch 52. One side of the main power supply is connected through resistor 63 and diode 64 to terminal 2, and terminal 7 also is connected to the other side of the main power source and Zener diode 67 again bridges terminals 2 and 7. Terminal 7 is coupled by a capacitor 74 to terminal 2, and unused active input terminal 9 is connected to terminals 10 and 11. A resistor 76 connects terminals 2 and 13.

In response to a signal from thermistor 37 representing excess temperature, an output signal is delivered from terminal 8 through a diode 75 and then through SCR 71 once more to terminal 7 of phase control 50 so as to inhibit pulse generation by the latter. When desired, a feedback resistor may be connected between pins 8 and 13 of zero-voltage switch 52, or other known means employed, in order to introduce a hysteresis characteristic as described above in connection with Schmitt trigger circuit 38; in this case, terminal 8 is referenced to terminal 7 through a resistor.

Zero-voltage switch 53 serves in the start control loop and performs the functions of trigger circuit 41 and pulse generator 40 in the system of FIG. 1. In this case, the speed-representative signal from winding 44 is fed through filter 43 and applied across active input terminal 9 and reference input terminal 7. Filter 43 is composed of a diode 77 connected in series with a resistor 78 to terminal 9, and a capacitor 79 is shunted between switch terminals 7 and 9. Terminal 7 is also coupled to terminal 2 by a capacitor 80 and returned to the $L_2$ side of the main power source at a point adjacent to the corresponding end of winding 15. The other power supply terminal 2 is returned to the $L_1$ side of the main power source through a rectifying diode 81 and resistor 82. A reference Zener diode 84 shunts terminals 2 and 7. The other active input terminal 13 is connected to terminals 10 and 11, and terminal 8 is returned to terminal 7. Finally, pulses produced from the output section of zero-voltage switch 53 are fed to the gate of solid-state switch 14 in order to fire the latter.

Thus, all sections of zero-voltage switch 53 are utilized in the system of FIG. 2. The threshold action of zero-voltage switch 53 is employed to control the speed or torque level of energization and de-energization of winding 12, while the zero-crossing detector within switch 53 assures proper timing of the firing pulses delivered to the gate of solid-state switch 14. When, as usually is the case, hysteresis in the operating characteristic is desired so that pick up and drop out of starting winding 12 will be at different speed or torque levels, terminal 8 is instead returned to terminal 7 by a first resistor and also returned to terminal 13 by a feedback resistor.

It will be observed that the system of FIG. 2 performs all of the functions described in detail with respect to the system of FIG. 1. Yet, the entire package is sufficiently small so as to be mounted directly on and in the motor casing. The thermistors and solid-state switches may be built directly into the stator assembly. while the monolithic circuits and the few discrete components are disposed in a small housing mounted on the shell. The resulting small size of the overall assembly may be appreciated by noting that each of zero-voltage switches 51–53 is only about ¾ of an inch long, ⅜ of an inch wide and 1/6 of an inch thick. The dimensions of phase control 50 are quite similar. By utilizing only standard, readily-available monolithic integrated circuits, substantial economy of manufacture also is obtained.

Figure 3:
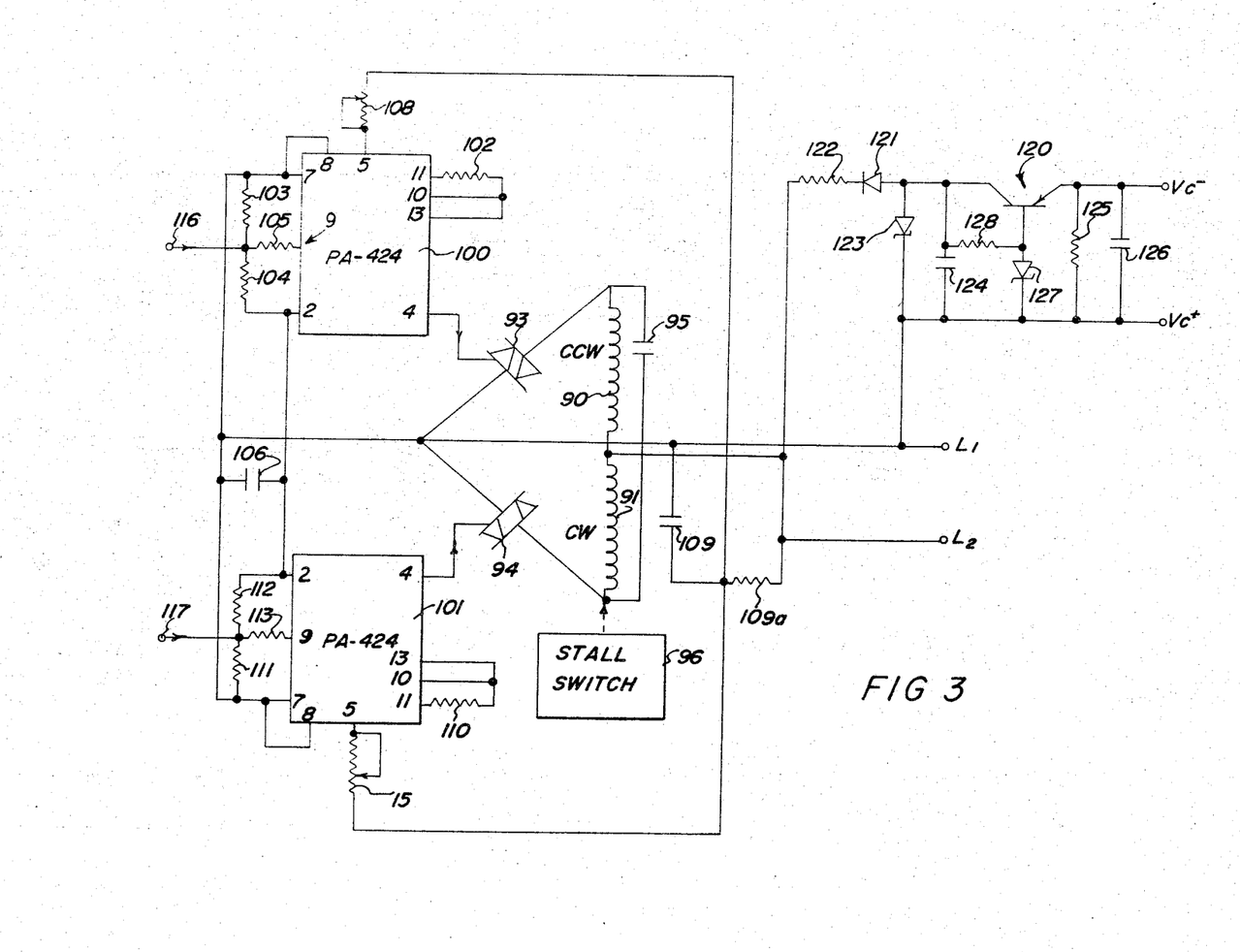
FIG. 3 is a schematic diagram of another motor control system.
Figure 4:
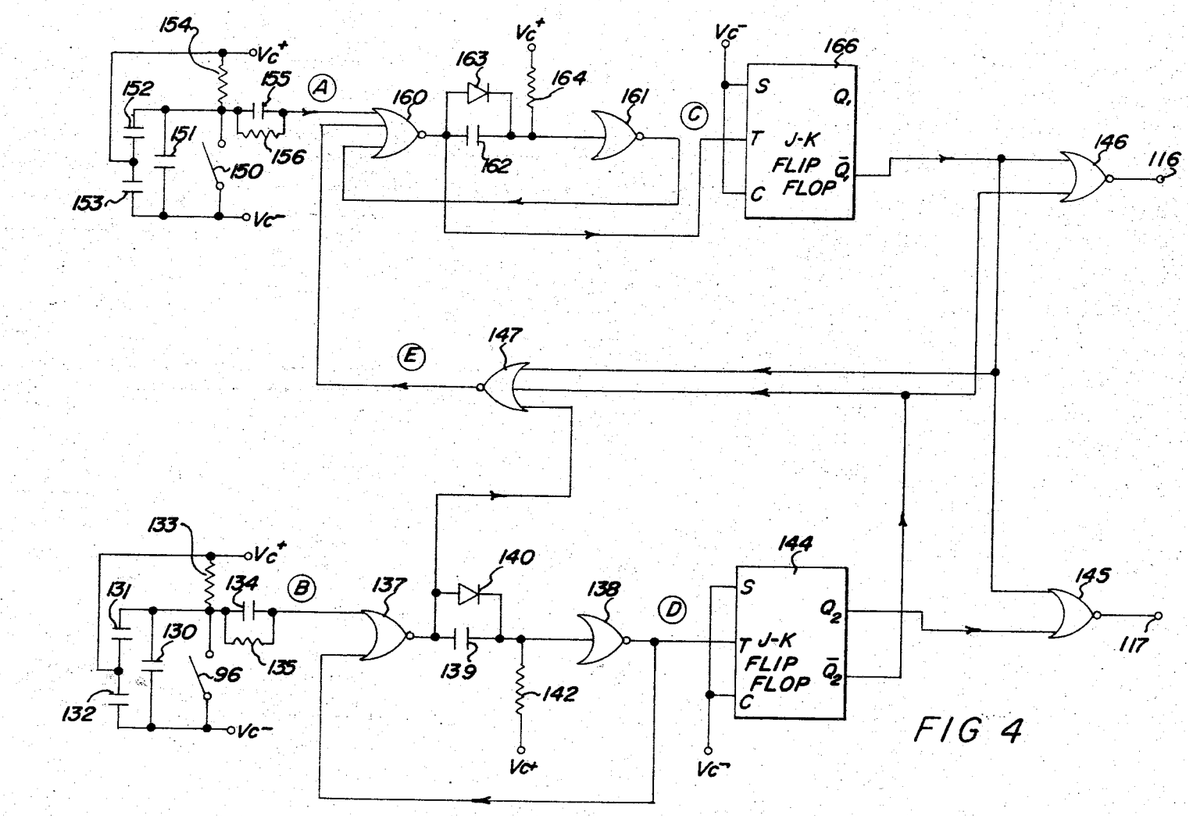
FIG. 4 is a schematic diagram of an external motor control system specifically implemented with the system of FIG. 3.

Additional flexibility of control and operation of an induction motor is provided by the overall system of FIGS. 3 and 4, while at the same time preserving the attractiveness which results from the use of standard monolithic integrated circuits. In FIG. 3, an induction motor again includes a pair of windings 90 and 91. The induction motor suitably is of the permanent split-phase capacitor-start type. The common junction between windings 90 and 91 is returned to one side $L_2$ of the power supply. The other end of winding 90 is returned to the other side $L_1$ of the power supply through a TRIAC 93, while the other end of winding 91 is returned through another TRIAC 94 also to line terminal $L_1$. A capacitor 95 is coupled between the non-common ends of windings 90 and 91.

The intendment in the system of FIG. 3 is to operate the motor selectively in either the clockwise or counterclockwise direction. For this purpose, the bridge-type connection between terminals $L_1$ and $L_2$ and windings 90 and 91 permits determination of direction of motor rotation in correspondence with selection of which one of switches 93 or 94 is conductive in any given operating period. When switch 93 is conductive, winding 90 serves as the run winding and winding 91 serves as the start winding. Conversely, when switch 94 is instead conductive, winding 91 serves as the run winding and winding 90 is the start winding. In practice, the characteristics of the normal running and starting windings of a typical split-phase induction motor are sufficiently similar to permit their alternate use as either run or start windings.

As actually drawn in FIG. 3, a separate start switch is not shown. When necessary or desirable, the start switch element is, of course, inserted directly in series with capacitor 95. For example, the start switch control of FIG. 2, including filter 43 and zero-voltage switch 53 together with solid-state switch 14 and measuring windings 15 and 44, may be utilized. In that case, primary winding 15 would be included in the line to terminal $L_2$ and solid-state switch 14 would be inserted in series with capacitor 95. With that arrangement, and again with reference to FIG. 2, terminal 8 can be returned to terminal 7 by a resistor so as to enable the derivation from terminal 8 of a signal representing the condition of the input section of switch 53. In this manner, the change induced in a pre-existing signal level at terminal 8 upon "pick up" of the start switch operation may be utilized as a stall or near-stall indication. Alternatively, a standard centrifugal-type start switch could be employed in connection with the motor in the system of FIG. 3 in which case an overload or stall signal is available directly from that switch. In any event, the FIG. 3 system includes a stall switch 96 responsive to substantial reduction in motor speed to provide a stall signal.

In FIG. 3 a pair of zero-voltage switches 100 and 101 are included in order selectively to apply firing pulses to respective solid-state switches 93 and 94. In this case, PA-424 zero-voltage switches again are used as a result of which the standarized terminal numbers are the same as previously described. Thus, the output firing pulses which appear at terminal 4 of zero-voltage switch 100 are applied to the gate of solid-state switch 93. Terminal 11 is connected to terminal 10 through a resistor 102, while terminal 10 is, in turn, connected to terminal 13. A resistance bridge composed of resistors 103 and 104 is connected between terminals 7 and 2 while an additional resistor 105 is connected between terminal 9 and the junction between resistors 103 and 104. Terminal 7 is connected to main line terminal $L_1$ and also is coupled to terminal 2 by a capacitor 106. Terminal 8 is connected to terminal 7. Finally, synchronizing terminal 5 is connected through a variable resistor 108 and a capacitor 109 to terminal $L_1$ of the alternating-current power supply and through a resistor 109a to terminal $L_2$.

It will be noted that the different connections to the other zero-voltage switch 101 are essentially the same as those to switch 100. When motor windings 90 and 91 have reasonably similar characteristics, the external discrete components associated with switch 101 may be identical to those associated with switch 100. On the other hand, modification in the different resistor values may be made in order to compensate differences that appear as between the characteristics of windings 90 and 91. In any event, switch 101 has its terminal 13 connected to terminal 10 with the latter, in turn, being connected to terminal 11 by a resistor 110. Terminal 4 of this second zero-voltage switch is connected to the gate of TRIAC 94. Terminal 7 is connected to terminal 8 as well as being connected to line $L_1$. Terminal 2 is coupled to $L_1$ by capacitor 106 and also through a resistance bridge, composed of resistors 111 and 112, to terminal 7. Terminal 9 is connected by a resistor 113 to the junction between resistance 111 and 112. Completing the interconnections, terminal 5 is coupled through variable resistor 115 and capacitor 109 back to terminal $L_1$ of the power source and through resistor 109a to terminal $L_2$.

FIG. 3 thus includes two separate firing-control systems respectively for TRIACs 93 and 94. The firing-control system including zero-voltage switch 100 responds to the appearance of a signal at a terminal 116, connected to the junction between resistors 103 and 104, by generating firing pulses which effect a conduction level in TRIAC 93 that is proportional to the phase-shifted voltage between line terminals $L_1$ and $L_2$. In turn, that voltage is an indirect measurement of the magnetic flux present in the iar gap of the motor. The imbalance introduced into the operation of zero-voltage switch 100 by means of resistors 102–105, together with the phase shifts imparted by capacitors 106 and 109, resistor 109a and variable resistor 108, enable operation of the system as a phase control loop analogous to the operation of the loop including phase control 50 in the system of FIG. 2. Variable-resistor 108 permits adjustment of the phase of the signal fed to synchronizing terminal 5, thereby permitting proportional modification within the zero-crossing detector of switch 100 so as to control timing of the output firing pulses from terminal 4 relative to the zero crossings of the alternating current power. In this particular case, that adjustment is particularly employed in order to obtain optimum starting torque. However, it may be alternatively optimized with respect to either line voltage or motor load speed. While the particular approach of FIG. 3 permits the use of a monolithic circuit simplified considerably in that it does not, in itself, include phase-control characteristics, it is to be recognized that, alternatively, the specific phase control loop components of the system of FIG. 2 may be substituted in the system of FIG. 3.

All these same considerations apply with respect to the other firing-control system including zero-voltage switch 101. In responds in the same way to a control signal appearing at an input terminal 117, connected to the junction between resistors 111 and 112, by controlling the conduction angle of TRIAC 94 in proportion to the phase-shifted line voltage applied instantaneously to the motor. Consequently, the motor will rotate in an assumed clockwise direction in response to the appearance of signals at input terminal 117. Alternatively, the motor is caused to rotate in a counterclockwise direction in response to control signals applied to input terminal 116. It is also to be noted that the amount of phase shift introduced in the signal fed to terminal 5 of both switches 100 and 101 is purposely made sufficiently large to insure the application of firing pulses to the TRIAC gates only in the absence of conduction by the TRIACs.

Also included in the system of FIG. 3 is a direct-current power supply for developing bias voltages useful in the system to be described in connection with FIG. 4. The power supply includes a pnp transistor having its collector connected through a rectifying diode 121 and a resistor 122 to line terminal $L_2$. Its emitter is connected to a negative direct-current output terminal $V_c-$. The other direct current output terminal $V_c+$ forms a common bus connected to line terminal $L_1$. Shunted between the collector and a common bus are a Zener diode 123 and a capacitor 124. Connected between the emitter and the common bus are a resistor 125 and a capacitor 126. Another Zener diode 127 connects the transistor base to the common bus, while a resistor 128 bridges the collector and base of the transistor. As such, this direct-current power supply is known and serves to provide a reasonably well regulated and filtered direct current between its two output terminals.

Turning next to the external control system of FIG. 4, it may be first observed that it also includes terminals 116 and 117 which serve to supply enabling signals respectively to zero-voltage switches 100 and 101 in the system of FIG. 3. Also, stall switch 96 in the system of FIG. 3 is represented in the system of FIG. 4 as a simple two-pole, single-throw mechanical switch associated with a direct-current charging network so that, upon closure of switch 96, an electrical stall signal will be developed. In more detail as to the latter, the terminals of switch 96 are bridged by a first capacitor 130 in turn shunted by a pair of series-connected capacitors 131 and 132. D.C. terminal $V_c-$ is connected to one terminal of switch 96 while its other terminal is connected to the other or positive D.C. terminal $V_c+$ through a resistor 133. Upon closure of the movable switch contact of switch 96, a pulse is fed through a capacitor 134, shunted by a resistor, 135, to one input terminal of a NOR gate 137. That pulse, as it appears in the circuit at the point represented by the symbol B, is not necessarily at all well defined and may take the form represented in line B of the state-time plots presented by FIG. 5.

Gate 137 is combined with a second NOR gate 138 in a manner to form a one-shot multivibrator. Thus, the output terminal of gate 137 is connected through a capacitor 139, paralleled by a diode 140, to an input terminal of gate 138. The junction between capacitor 139 and gate 138 is returned to the positive D.C. terminal through a resistor 142. The output terminal of gate 138 is returned to the other input terminal of gate 137. In operation, the resulting multivibrator responds to the often "sloppy" pulse produced as a result of closure of switch 96 by developing at the output terminal of gate 138 a well-defined and cleanly-shaped square pulse as illustrated in line D of FIG. 5 and corresponding to point D at the output of gate 138. The latter output terminal also is connected to the toggle input terminal of a J-K flip-flop circuit 144.

In itself, flip-flop 144 is entirely conventional and has its S and C (or J and K) input terminals connected together and returned to the negative potential of the direct current source so that it operates in the well-known toggle mode. Each successive input pulse applied to toggle input terminal T results in a reversal of the signal conditions appearing at its output terminals $Q_2$ and $\bar{Q}_2$. That is, if the signal on $Q_2$ is a logic one, the signal at the other output terminal is a logic zero. The next toggle pulse received reverses the output signal so that $Q_2$ then develops a logic zero and the other output terminal develops a logic one. Output terminal $Q_2$ of flip-flop 144 is connected to one input terminal of a NOR gate 145, while its other output terminal $\bar{Q}_2$ is connected both to one input terminal of a NOR gate 146 and an input terminal of still another NOR gate 147. The output terminal of NOR gate 145 is connected to terminal 117, and the output terminal of NOR gate 146 is connected to terminal 116.

A similar chain of components is operated by a command signal developed upon closure of a switch 150. Thus, one terminal of command switch 150 is connected to the negative direct-current source terminals $V_c-$ and the other terminal is connected to the positive direct-current source $V_c+$ through resistor 154. The terminals of switch 150 also are shunted by a capacitor 151 in turn bridged by the series combination of capacitors 152 and 153. The pulse developed upon closure of command switch 150 is fed through a capacitor 155, shunted by a resistor 156, to a first input terminal of a NOR gate 160.

Again forming a one-shot multivibrator, in combination with gate 160 is still another NOR gate 161 that has its outupt terminal connected back to a second input terminal of gate 160. The output terminal of the latter is coupled through a capacitor 162, shunted by a diode 163, to the input terminal of gate 161 with the latter also being returned through a resistor 140 to the positive D.C. source terminal.

In this case, the multivibrator output signal is taken from the output terminal of NOR gate 160 and fed to the toggle input T of a second J-K flip-flop 166. Again, for operation in the toggle mode, its input terminals S and C are connected together to the negative D.C. source terminal. Finally, its output terminal $\bar{Q}_1$ is connected to the other input terminal of NOR gate 146 as well as to the second input terminal of NOR gate 145 and a second input terminal of NOR gate 147. Completing the interconnections, the output terminal of NOR gate 147 is connected to a third input terminal of NOR gate 160, and the output terminal of NOR gate 137 is connected to a third input terminal of NOR gate 147.

In tracing the operation of the system of FIG. 4, it is necessary only to keep in mind the toggle mode of operation of flip-flops 144 and 166 and the truth table applicable to all of the NOR gates. With respect to the latter, each NOR gate will produce a logic one at its output only when the signals appearing at all of its input terminals are logic zeros. For all other possible input-signal combinations, the output signal represents a logic zero. Moreover, the arrangement is such that, when $\bar{Q}_1$ is a logic one, the motor is turned off because that signal is applied simultaneously to both gates 145 and 146. When the latter signal instead is a logic zero, a logic one at terminal $\bar{Q}_2$ of flip-flop 144 opens gate 146 disabling operation of TRIAC 93 (in FIG. 3). At the same time, logic zeros appear at both inputs of gate 145 as a result of which TRIAC 94 is fired and the motor runs in a clockwise direction. One receipt of a subsequent pulse at the toggle input of flip-flop 144, as occurs each time the motor is commanded to stop or develops a stall signal, the signal at terminal $\bar{Q}_2$ becomes a logic zero and the signal at the other output terminal $Q_2$ of that flip-flop now becomes a logic one. Consequently, TRIAC 94 is disabled, while gate 146 is conditioned to permit firing of TRIAC 93 and consequent counter-clockwise rotation of the motor upon receipt of the next command pulse.

NOR gate 147 serves as an interlock between the stall and command signals. When a stall condition develops while the motor is rotating in a counter-clockwise direction, it will be observed that all three inputs of gate 147 are logic zeros as a result of which a logic one is fed to the multivibrator including gate 160 so as to toggle flip-flop 166 and stop the motor. If, instead, the motor is rotating in a clockwise direction when it becomes overloaded so that a stall signal is developed, the latter toggles flip-flop 144 as a result of which the direction of motor rotation is reversed.

Figure 5:
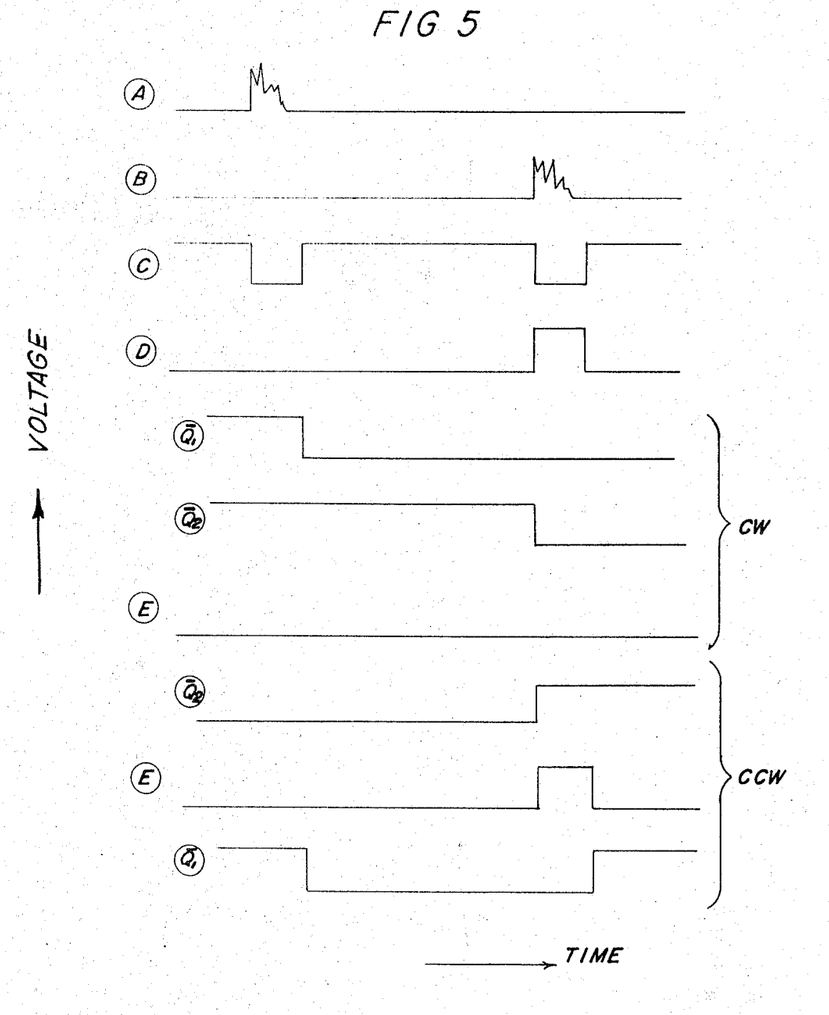
FIG. 5 is a series of state-time plots useful in understanding the operation of the circuitry of FIG. 4.

As already indicated in part, the different time-voltage waveforms in FIG. 5 are labeled to correspond to the correspondingly labeled points in the system of FIG. 4. Particularly represented are the changes in state at the different points which occur when a start pulse is followed by a stall pulse. The stall pulse turns off the motor, when it is going counter-clockwise, by causing the development of a logic one at point E. on the other hand, the appearance of the stall pulse while the motor is going clockwise simply changes the state of flip-flop 144 as a result of which the motor reverses direction. Thus, flip-flop 144 may be viewed as controlling the forward-reverse function of the system, while flip-flop 166 provides the on-off system function.

One particular area of utility for the system of FIGS. 3 and 4 resides in the manufacture of garage door openers under control of directly or indirectly produced command signals. Door operation may be alternately started and stopped with movement of the door starting each time in a direction opposite that of its last movement. Assuming that the up direction of door movement corresponds to the counter-clockwise direction of motor rotation in the particular system of FIGS. 3 and 4, movement of the door upwardly will automatically be stopped each time a stall occurs; this function also may be used as a limit switch for stopping the motor when the door reaches its full overhead position. On the other hand, during downward movement the occurrence of a stall condition causes the motor promptly to reverse the direction of movement of the door. Such automatic reversal may be a desired safety measure in cases where the downwardly moving door strikes an object such as a person or a vehicle. It may be noted that the system of FIG. 4 inherently involves the use of memory in the sense that, on the occurrence of either a command or stall signal that calls for a change in motor operation, a preordained change will occur in response to a specific signal because the system "remembers" its last previous instruction.

As in the case of the system of FIG. 2, the combined system of FIGS. 3 and 4 is capable of being fabricated from economical readily-available and standardized monolithic circuits which combine to result in a comparatively small package. Thus, it is contemplated to use two PA-424 zero-voltage switches, one MC-890P dual J-K flip-flop, one MC-824P quad two-input gate unit which provides the function of NOR gates 137, 138, 145 and 146 and one MC-292P triple 3-input gate unit which provides the functions of NOR gates 147, 160 and 161. Each of these multi-unit monolithic packages, of course, requires its own separate power connections to the appropriate direct current source terminals; being standard, such connections have not been shown in the drawing with respect to the logic gates or the flip-flops. Moreover, all unused input terminals of the logic-circuit components are returned to the negative direct-current terminal.

In practice, as is always the case when using logic circuits, immunity from noise can be an ever-present problem particularly when utilizing a mechanical sensing switch in the motor. To a large extent, this problem is minimized by reason of the inclusion of the one-shot multivibrators that develop sharp output pulses in response to what may be very noisy input signals. In principle, however, the one-shot multivibrators in the system of FIG. 4 may be replaced with simple logic elements in order to permit the command and stall signals to act directly as toggle signals for operating the respective flip-flops. For example, the multivibrator responsive to the command signals may be replaced with a gate so as to toggle flip-flop 166 either upon receipt of a command signal or of a signal from NOR gate 147. At the same time, the multivibrator responsive to the stall signals could be replaced with a gate connected between the stall signal source and the input of NOR gate 147 responsive to the existence of the stall signal, with the stall signal source also being directly connected to the toggle input of flip-flop 144.

Further in the interest of noise immunity in a problem environment, additional capacitive by-passing may be incorporated as needed on the alternating current power line input and across all switch elements. Generally speaking, the resistance-transistor logic circuits specifically suggested have a poorer noise margin than diode transistor logic circuits or so-called high level logic circuits. Nevertheless, the substantially lower cost of resistance-transistor logic circuits, as well as their consequent greater availability in various circuit arrangements suggests that they usually are to be preferred. While other modifications, including different logic element substitutions, may suggest themselves, attention must be given to the retention of compatability as between the different monolithic circuit components. For example, an analog circuit that has a "sink" input (current flowing out of its input terminal) requires a preceding logic stage that has a "source" output. Furthermore, a consistent D.C. ground level must be chosen and appropriate connections to the direct current supply utilized in order to accommodate some components which require a negative potential and others which require a positive potential with respect to ground.

In all of the various embodiments discussed, one primary feature is the capability of utilizing available monolithic integrated circuits in order to achieve economical and compact overall systems. At the same time, each of the different systems also is capable of being fully integrated onto a single chip by utilization of large scale integrated circuit fabrication techniques. An analog approach has been utilized in order to provide proportional control of motor operation by the use of phase control loops. Digital logic approaches have then been combined in order to provide both starting and thermal protective circuitry as well as multifunction external control. Discernable and highly useful results have been illustrated in connection with the evaluation of working embodiments.

While in accordance with the patent statutes, there have been described what at present are considered to be the preferred embodiments of the invention, it will be obvious to those skilled in the art that numerous changes and modifications may be made therein without departing from the invention and it is therefore aimed in the appended claims to cover all such equivalent variations as fall within the true spirit and scope of the invention.

I claim:

1. A control system for an induction motor having a main winding and an auxiliary winding adapted for excitation by an alternating-current source, the system comprising:
   measuring means incorporated in said motor for developing a control signal proportional to the level of magnetic flux present in the air gap of said motor;
   a solid-state gate-operated bidirectional switch for controllably delivering power from the source to said main winding in an amount proportional to the conduction angle established by its gate;
   regulating means responsive to said control signal and to the instantaneous phase angle of the alternating current for initiating a control pulse timed after a zero crossing of the alternating current by an amount representing said control signal;
   and trigger means responsive to said control pulse and to the conduction state of said switch for applying a firing pulse to said gate in correspondence with said control pulse and only in the absence of conduction by said switch.

2. A control system as defined in claim 1 in which said trigger means includes a generator for developing said firing pulse and an AND gate for enabling said generator only upon coincidence of said control pulse and said conduction absence.

3. A control system as defined in claim 1 in which said trigger means includes a generator for developing said firing pulse and means for inhibiting operation of said generation in the absence of said conduction.

4. A control system as defined in claim 1 in which said regulating means includes a filter for effectively delaying transmission of said control signal by an amount increasing starting torque of said motor.

5. A control system as defined in claim 1 which further includes:
   sensing means for developing a thermal signal representative of temperature in said motor;
   threshold means responsive to said thermal signal for developing an inhibit signal representing an increase in said temperature beyond a predetermined level;
   and means responsive to said inhibit signal for disabling said trigger means and preventing application of said firing pulse to said gate.

6. A control system as defined in claim 5 in which said trigger means includes an AND gate enabling application of said firing pulse only upon coincidence of said control pulse, the absence of said conduction and the absence of said inhibit signal.

7. A control system as defined in claim 5 which further includes:
   second sensing means for developing a second thermal signal representative of temperature in said motor, said second thermal signal being delayed in time relative the first thermal signal developed by the first sensing means;
   second threshold means responsive to said second thermal signal for developing a second inhibit signal representing an increase in said temperature beyond a selected level;

and means responsive to said second inhibit signal for also disabling said trigger means and preventing application of said firing pulse to said gate.

8. A control system as defined in claim 7 in which said means responsive to said first and second inhibit signals includes a gate to which said trigger means is responsive.

9. A control system as defined in claim 1 which further includes:
a second solid-state gate-operated bidirectional switch for controllably delivering power from the source to said auxiliary winding;
detection means for developing a signal representative of the speed of said motor;
threshold means responsive to conduction of the first switch for applying firing pulses to the gate of said second switch and responsive to said speed-representative signal for disabling conduction of said second switch when said speed reaches a predetermined value.

10. A control system as defined in claim 9 in which said threshold means responds to said conduction of said first switch by sensing said speed-representative signal, and in which said threshold means includes a filter for delaying said speed-representative signal.

11. A control system as defined in claim 9 in which said threshold means includes:
a generator for applying firing pulses to the gate of said second switch;
and a Schmitt trigger circuit responsive to said speed-representative signal for enabling and disabling said generator.

12. A control system as defined in claim 1 in which said measuring means includes a winding exposed to said magnetic flux in said air gap.

13. A control system as defined in claim 1 which includes:
a second solid-state gate-operated bidirectional switch for controllably delivering power from the source to said auxiliary winding in an amount proportional to the conduction angle established by its gate;
second regulating means responsive to said control signal and to the instantaneous phase angle of the alternating current for initiating a second control pulse timed after a zero crossing of the alternating current by an amount representing said control signal;
second trigger means responsive to said second control pulse and to the conductive state of said second switch for applying a firing pulse to the gate of said second switch in correspondence with said second control pulse and only in the absence of conduction by said second switch;
and selection means responsive to actuating signals for selectively enabling said first and second regulating and trigger means.

14. A control system as defined in claim 13 which includes means interconnecting said switches, said windings and said source for operation of said motor in one direction upon conduction of the first switch and in the other direction upon conduction of said switch, and said selection means disables one when enabling the other of said first and second regulating and trigger means.

15. A control system as defined in claim 14 in which said selection means includes:

a source of command signals;
a logic element responsive to said command signals for producing a toggle pulse;
and a flip-flop responsive to each successive toggle pulse for developing one of said actuating signals.

16. A control system as defined in claim 15 in which said selection means further includes:
means responsive to a substantially decreased speed of said motor for producing a stall signal;
a second logic element responsive to said stall signal for producing a second toggle pulse;
and a second flip-flop responsive to each successive one of said second toggle pulses for developing the other of said actuating signals.

17. A control system as defined in claim 16 in which said selection means further includes:
a plurality of logic gates interconnected with said logic elements and flip-flops for effecting alternate stopping and starting of said motor in response to each successive one of said command signals, with said motor reversing direction upon each successive new start, for effecting reversal of said motor in response to a stall signal when said motor is operating in one direction and for effecting de-energization of said motor in response to a stall signal when operating in the other direction.

18. A control system as defined in claim 1 in which said regulating means and said trigger means comprise:

a zero-voltage switch having a differential input section, a zero crossing detector responsive to said input section and an output section responsive to said detector for developing said firing pulse;
means coupling said output section to the gate of said bidirectional switch;
and means responsive to said control signal and coupled to said zero-crossing detector for adjustably shifting the phase of said control signal in regulation of the initiation of said control pulse.

19. A control system for an induction motor having a pair of windings, comprising:
a pair of solid-state gate-operated bidirectional switches for controllably delivering power from a source respectively to said windings, conduction of said respective switches effecting operation of said motor in mutually opposite directions;
means, including a pair of firing-pulse generators individually coupled to the respective gates of said switches, responsive to voltage across said motor for adjustably regulating its development of torque and for selectively enabling said switches in response to actuating signals;
a source of command signals;
means responsive to a substantially decreased speed of said motor for producing a stall signal;
and means, including a plurality of toggle switches and logic gates responsive to said stall and command signals to produce said actuating signals, for effecting alternate stopping and starting of said motor in response to each successive one of said command signals, with said motor reversing direction upon each successive new start, for effecting reversal of said motor in response to a stall signal when said motor is operating in one direction and for effecting de-energization of said motor in response to a stall signal when operating in the other direction.

20. A control system for an induction motor having a pair of windings comprising:
a pair of solid-state gate-operated bidirectional switches for controllably delivering power respectively to said windings, conduction of said respective switches effecting operation of said motor in mutually opposite directions;
means, including a first logic gate responsive to concurrent input signals, for firing one of said switches;
means, including a second logic gate responsive to concurrent input signals, for firing the other of said switches;
a source of command signals;
a first toggle-mode flip-flop responsive to each successive one of said command signals for changing the state of its output signal between a logic zero and a logic one;
means responsive to a substantially decreased speed of said motor for producing a stall signal;
a second toggle-mode flip-responsive to each successive one of said stall signals for changing in opposite directions the states of its pair of output signals between a logic zero and a logic one;
means for coupling the output signal of said first flip-flop to one input of each of said first and second logic gates;
means for coupling one output signal from said second flip-flop to the other input of said first logic gate;
means for coupling the other output signal from said second flip-flop to the other input of said second logic gate;
a third logic gate responsive to three concurrent input signals for developing an output signal;
means responsive to the output signal from said third logic gate for effecting toggling of said first flip-flop;
means for coupling the first one of the inputs of said third logic gate to the output of said first flip-flop;
means for coupling the second one of the inputs of said third logic gate to receive said one output signal from said second flip-flop;
and means for coupling the third one of the inputs of said third logic gate to receive a signal representing the occurrence of said stall signal.

21. A control system as defined in claim 20 which further includes:
a first logic element responsive to each of said command signals for developing a toggle pulse;
a second logic element responsive to each of said stall signals for developing a toggling pulse;
and in which said first flip-flop responds directly to said toggle pulse and said second flip-flop responds directly to said toggling pulse.

22. A control system for an electric motor comprising:
measuring means incorporated in said motor for developing a control signal proportional to the level of magnetic flux present in the air gap of said motor;
a solid state gate operated bidirectional switch for controllably delivering power from an alternating current source to a winding in the motor in an amount proportional to the conduction angle established by its gate;
regulating means responsive to said control signal and to the instantaneous phase angle of the alternating current for initiating a control pulse timed after a zero crossing of the alternating current by an amount representing said control signal;
trigger means responsive to said control pulse and to the conduction state of said switch for applying a firing pulse to said gate in correspondence with said control pulse and only in the absence of conduction by said switch;
sensing means for developing a signal representative of temperature in said motor;
threshold means responsive to said temperature representative signal for developing an inhibit signal representing an increase in said temperature beyond a predetermined level; and
means responsive to said inhibit signal for disabling said trigger means and preventing application of said firing pulse to said gate.

* * * * *